(12) United States Patent
Bierl et al.

(10) Patent No.: US 8,047,082 B2
(45) Date of Patent: Nov. 1, 2011

(54) DEVICE FOR DETERMINING A MASS FLOW OF A FIRST GAS WITHIN AN OVERALL MIXTURE OF GASES

(75) Inventors: Rudolf Bierl, Regensburg (DE); Martin Lesser, Landshut (DE); Andreas Meyer, Zell (DE); Frank Steuber, Kornwestheim (DE)

(73) Assignee: Continental Automotive GmbH, München (DE)

( * ) Notice: Subject to any disclaimer, the term of this patent is extended or adjusted under 35 U.S.C. 154(b) by 273 days.

(21) Appl. No.: 12/086,300

(22) PCT Filed: Nov. 20, 2006

(86) PCT No.: PCT/EP2006/068640
§ 371 (c)(1),
(2), (4) Date: Jun. 9, 2009

(87) PCT Pub. No.: WO2007/065785
PCT Pub. Date: Jun. 14, 2007

(65) Prior Publication Data
US 2009/0249888 A1 Oct. 8, 2009

(30) Foreign Application Priority Data

Dec. 8, 2005 (DE) .......................... 10 2005 059 062

(51) Int. Cl.
*G01F 1/66* (2006.01)
(52) U.S. Cl. .................................. 73/861.28; 73/861.04
(58) Field of Classification Search .......................... None
See application file for complete search history.

(56) References Cited

U.S. PATENT DOCUMENTS

| 4,754,650 A | 7/1988 | Braswell |
| 4,922,750 A | 5/1990 | Magori |
| 5,247,826 A | 9/1993 | Bauer |
| 5,325,703 A | 7/1994 | Màgori |

(Continued)

FOREIGN PATENT DOCUMENTS

CH 555473 A 10/1974

(Continued)

OTHER PUBLICATIONS

German Office Action dated Jun. 12, 2008 issued in corresponding application No. 10 2005 059 062.4.

*Primary Examiner* — Harshad Patel
(74) *Attorney, Agent, or Firm* — Cosen O'Connor

(57) ABSTRACT

A device is provided for determining a mass flow of a first gas flowing in a flowing channel of an internal combustion engine of a motor vehicle. The device includes: sound transducers arranged at respective ends of a measuring path for providing sound signals, a temperature sensor for determining a temperature of an overall mass flowing in the flow channel, and an evaluation unit arranged downstream of the sound transducers. The evaluation unit is capable of carrying out the following: determining a flow rate of the overall mass and a speed of sound based on delay times of the sound signals, determining an overall mass flow based on the flow rate, the temperature, and a pressure of the overall mass in the flowing channel, ascertaining a proportion of a second gas flowing in the flow channel at a temperature above 10° C. and based on the speed of sound and the temperature, and correcting the overall mass flow to obtain the mass flow of the first gas.

2 Claims, 2 Drawing Sheets

U.S. PATENT DOCUMENTS

| | | | |
|---|---|---|---|
| 5,546,813 A | 8/1996 | Hastings | |
| 6,460,402 B1 | 10/2002 | Gomm | |
| 6,487,916 B1 | 12/2002 | Gomm | |
| 6,568,281 B1 | 5/2003 | Sato et al. | |
| 6,886,412 B2 | 5/2005 | Banno et al. | |
| 6,991,607 B2 * | 1/2006 | Muz et al. | 600/532 |
| 2008/0208483 A1 * | 8/2008 | Loose et al. | 702/22 |
| 2009/0178490 A1 * | 7/2009 | Konzelmann et al. | 73/861.29 |

FOREIGN PATENT DOCUMENTS

| | | |
|---|---|---|
| DE | 3312092 A1 | 10/1984 |
| DE | 4011526 A1 | 10/1991 |
| DE | 4237907 A1 | 5/1994 |
| DE | 4336174 A1 | 4/1995 |
| DE | 4343855 C2 | 7/1995 |
| DE | 4442078 A1 | 5/1996 |
| DE | 19727597 C1 | 8/1998 |
| DE | 10156854 A1 | 2/2003 |
| EP | 0262441 A1 | 4/1988 |
| EP | 0477419 A1 | 4/1992 |
| EP | 0 533 980 | 3/1993 |
| EP | 1077365 A2 | 2/2001 |
| EP | 1233266 A2 | 8/2002 |
| JP | 5346336 A | 12/1993 |
| WO | WO 9518958 A1 | 7/1995 |
| WO | WO 2007/020113 * | 2/2007 |

* cited by examiner

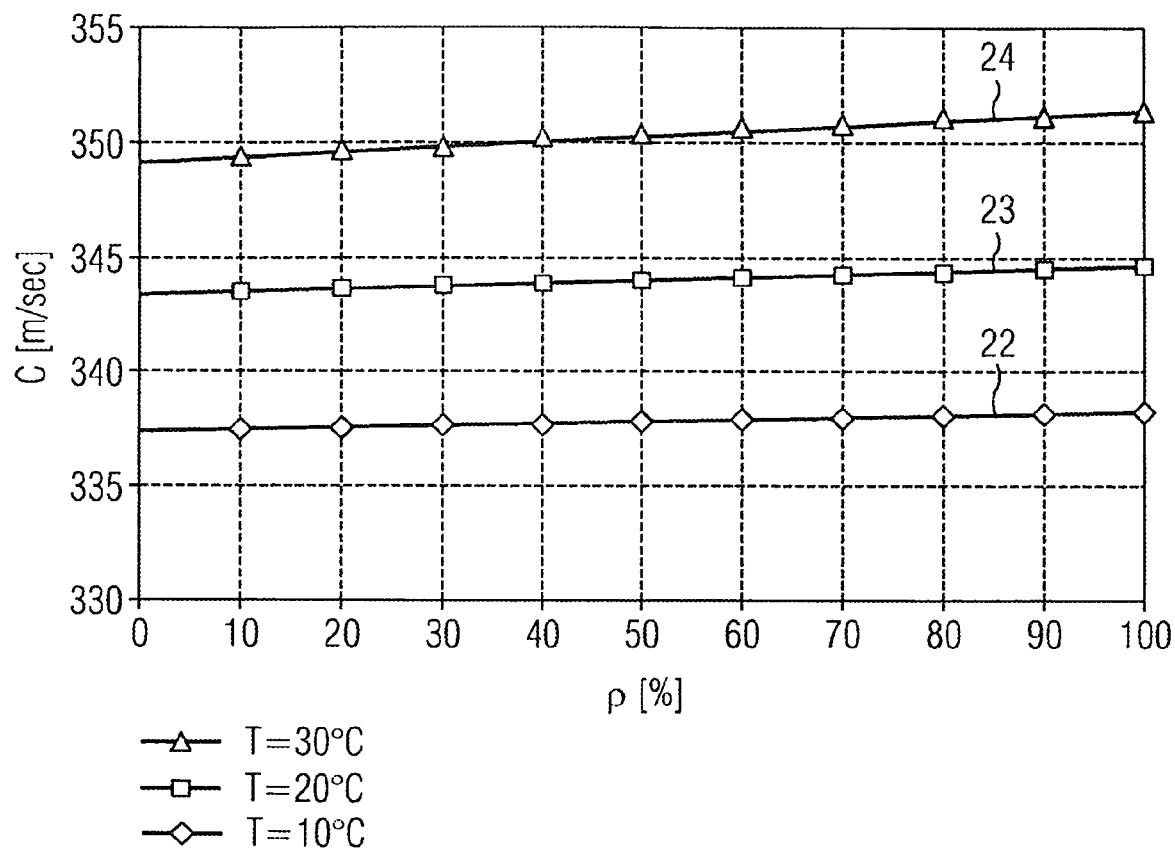

DEVICE FOR DETERMINING A MASS FLOW OF A FIRST GAS WITHIN AN OVERALL MIXTURE OF GASES

CROSS REFERENCE TO RELATED APPLICATIONS

This is a U.S. national stage of application No. PCT/EP2006/068640, filed on Nov. 20, 2006. Priority is claimed on German Application No. 10 2005 059 062.4, filed Dec. 8, 2005.

BACKGROUND OF THE INVENTION

1. Field of the Invention

The invention relates to a device for determining a mass flow of a gas flowing in a flow channel.

2. Description of the Related Art

Such a device is known from U.S. Pat. No. 4,754,650. The known device has two ultrasonic transducers that are arranged at the ends of a measuring path and are installed on the wall of a flow channel. With the aid of the ultrasonic transducers, the delay time of sound signals along the measuring path can be determined. From the delay times, the flow rate of the gas flowing in the flow channel and the speed of the sound of the sound signal in the gas can be ascertained. In the case of the known device, the average molecular weight of the gas flowing in the flow channel is determined from the speed of sound ascertained. As a result, it is possible with a known pressure and known temperature to determine the mass flow of the gas flowing in the flow channel.

Furthermore, a built-in unit with an ultrasonic flowmeter, intended in particular for measuring the air mass in a motor-vehicle engine, is known from EP 0 477 419. This built-in unit likewise comprises sound transducers arranged at the ends of a measuring path and with which the delay time of sound signals can be determined. From the delay time of the sound signals, the flow rate of the air flowing in the flow channel can then be determined. By means of an additional temperature sensor and a further pressure sensor, the mass flow of the air flowing in the flow channel can then be ascertained. However, the air taken in always contains a certain proportion of air moisture, and consequently of water mass. On account of the additional water mass, the measured value of the air mass is susceptible to error.

SUMMARY OF THE INVENTION

Starting out from this prior art, the invention is based on the object of providing a device for determining the mass flow of a gas in the presence of a further gas.

In the device, the evaluation unit determines on the basis of the delay times of the sound signals the flow rate and ascertains on the basis of pressure and temperature an overall mass flow. Furthermore, the evaluation unit ascertains from the delay times the speed of the sound and from this ascertains a proportion of a further gas flowing in the flow channel. The evaluation unit is then capable of correcting the overall mass flow to the mass flow of the gas.

In the device, there is consequently no need for a separate sensor for the proportion of the further gas in the gas stream. Rather, the mass flow of the gas can be determined even in the presence of a further gas, as long as the pressure and temperature are known.

In a preferred embodiment, the evaluation unit is connected to a temperature sensor and a pressure sensor, which make latest values for temperature and pressure available to the evaluation unit. Consequently, the device can also be operated under fluctuating pressure and varying temperature.

In a further preferred embodiment, the evaluation unit determines on the basis of the speed of sound the proportion of water contained in an air stream and corrects the overall mass flow to the mass flow of the air stream.

As a result, the device is suitable in particular for measuring the air mass flow in the intake line of an internal combustion engine for a motor vehicle.

BRIEF DESCRIPTION OF THE DRAWINGS

Further details and advantages of the invention emerge from the following description, in which exemplary embodiments of the invention are explained in detail on the basis of the accompanying drawings, in which:

FIG. 2 is a diagram showing the dependence of the speed of sound on the relative humidity for different temperatures.

DETAILED DESCRIPTION OF THE EMBODIMENTS

Figure 1:
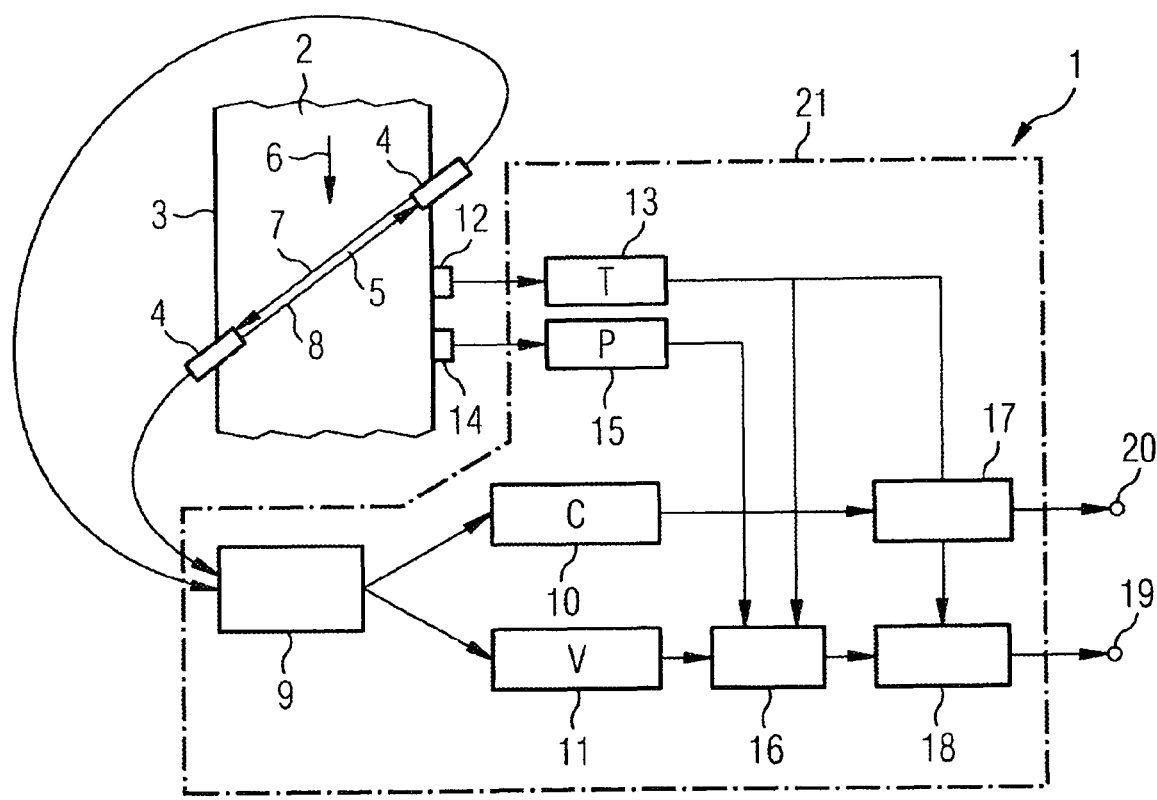
FIG. 1 shows a block diagram for determining a mass flow in a flow channel.

FIG. 1 shows a measuring device 1, with which the air mass flow in an intake pipe 2 of an internal combustion engine of a motor vehicle can be determined. The measuring device 1 comprises ultrasonic transducers 4, which are arranged in a wall 3 of the intake pipe 2 and define a measuring path 5. The measuring path 5 extends transversely through the intake pipe 2 at an angle to a flow direction 6.

The ultrasonic transducers 4 are capable of both sending and receiving ultrasound. Therefore, ultrasound signals 7 are sent and received in the flow direction 6 by the ultrasonic transducers 4. Further ultrasound signals 8 are sent and received in a flow direction opposite to the flow direction 6.

A delay-time measuring circuit 9 downstream of the ultrasonic transducers 4 determines delay times $t_d$ for the ultrasound signals 7 and delay times $t_u$ for the ultrasound signals 8. Disregarding various disturbing effects that can falsify the measuring result, the flow rate v of the gas in the intake pipe 2 is proportional to $\Delta t / t_u t_d$, where $\Delta t$ is the difference between the delay times $t_u$ and $t_d$. The speed of sound c of the gas in the intake pipe 2 is then proportional to $\Sigma t / t_u t_d$, where $\Sigma t$ is the sum of the delay times.

The speed of sound c is determined in an arithmetic unit 10 downstream of the delay time measuring circuit 9 and the flow rate v is determined in a further arithmetic unit 11 downstream of the delay-time measuring circuit 9.

Also arranged on the intake pipe 2 are a temperature sensor 12 with a downstream temperature-measuring circuit 13 and a pressure sensor 14 with a downstream pressure-measuring circuit 15. The measured values for temperature T and pressure P supplied by the temperature-measuring circuit 13 and the pressure-measuring circuit 15 can be used in an arithmetic unit 16 downstream of the arithmetic unit 11 for determining an overall mass flow. Since the overall pressure is made by partial pressure of the air and partial pressure of the water vapor, the overall mass flow is not equal to the air mass flow. Rather, the overall mass flow must be corrected with regard to the water-vapor mass flow. For this purpose, the proportion of the mass of the water vapor contained in the overall mass flow is determined in a further arithmetic unit 17, on the basis of the speed of sound c determined in the arithmetic unit 10 and the measured value for the temperature supplied by the temperature-measuring circuit 13. The overall mass flow is corrected to the mass flow of the air in a further arithmetic unit 18.

The value for the air mass flow can then be transferred to an output 19 of an engine control module. Furthermore, at a further output 20, the measured value of the air moisture can be passed onto the engine control module.

It should be noted that the delay-time measuring circuit 9, the temperature-measuring circuit 13, the pressure-measuring circuit 15 and the arithmetic units 10, 11, 16-18 form an evaluation unit 21, which may be integrated in one physical device or else be distributed between a number of physical devices. The function of the arithmetic units 10, 11, 16-18 can also be accomplished with the aid of software that runs on a microprocessor of the evaluation unit 21.

To this extent, the delay-time measuring circuit 9, the temperature-measuring circuit 13, the pressure-measuring circuit 15 and the arithmetic units 10, 11, 16-18 represent functional units that can be set up with software or hardware.

Furthermore, it should be noted that the measuring device 1 can significantly influence the measuring result, in particular in the temperature range above 10° C. This is to be explained in more detail on the basis of FIG. 2.

FIG. 2 shows a diagram in which the dependence of the speed of sound c in air is plotted against the relative humidity $\rho$. A curve 22 indicates the change in the speed of sound c at a temperature T=10° C. A further curve 23 illustrates the change in the speed of sound c in air in dependence on the relative humidity $\rho$ at the temperature T=20° C. and a further curve 24 illustrates the variation in the speed of sound c at a temperature T=30° C.

It is clear from FIG. 2 that the change in the speed of sound depends relatively strongly on temperature T. By contrast, the dependence of the speed of sound c on the relative humidity $\rho$ is rather weaker. The dependence is all the greater the higher the temperature, since the absolute proportion by mass of the water vapor contained in air increases greatly with increasing air temperature. At the air temperature T=10° C., the difference between the speed of sound c at the humidity $\rho$=0% and the speed of sound c at the humidity $\rho$=100% is approximately 0.5 m/s. The same change in the speed of sound c is also caused by a temperature change of approximately 1° C. At the air temperature T=30° C., the difference between the speeds of sound c at humidities $\rho$=0% and $\rho$=100% is approximately 2.5 m/s.

It is clear from FIG. 2 that, for a water correction, the temperature must be determined as accurately as possible with a measuring inaccuracy of less than 1° C. However, the measuring inaccuracy in the determination of the temperature is not necessarily relevant at a temperature below 20° C., in particular below 10° C., since at such a temperature the absolute water content in the air is small, and so the measuring result for the air mass flow is not significantly falsified.

With the device described here, the air mass flow taken in by an internal combustion engine can be determined in particular. However, other applications in which there is a gas mixture that comprises two main components and the mass flow of one of the two main components is to be determined are also conceivable.

The invention claimed is:

1. A device for determining a mass flow of a first gas flowing in a flow channel in an intake pipe of an internal combustion engine of a motor vehicle, the device comprising:
   sound transducers arranged at respective ends of a measuring path configured to send and receive sound signals in the flow channel in the intake pipe;
   a temperature sensor for determining a temperature of an overall mass flowing in the flow channel;
   an evaluation unit arranged in a signal path downstream of the sound transducers, wherein the evaluation unit is configured to:
      determine a flow rate of the overall mass flowing in the flow channel and a speed of sound based on delay times of the sound signals received by the sound transducers,
      determine the overall mass flow based on the flow rate, the temperature, and a pressure of the overall mass in the flowing channel,
      ascertain a proportion of a second gas flowing in the flow channel at a temperature above 10° C. and based on the speed of sound and the temperature, and correct the overall mass flow to obtain the mass flow of the first gas; and
   a pressure sensor configured to determine the pressure of the overall mass in the flowing channel.

2. The device as claimed in claim 1, wherein the second gas is a mass of water vapor.

* * * * *